(12) United States Patent
Gong et al.

(10) Patent No.: US 9,749,262 B2
(45) Date of Patent: Aug. 29, 2017

(54) PACKET PROCESSING METHOD AND FORWARDING ELEMENT

(71) Applicant: Huawei Technologies Co., Ltd., Shenzhen, Guangdong (CN)

(72) Inventors: Jun Gong, Beijing (CN); Wenyang Lei, Beijing (CN); Xiaofei Xu, Beijing (CN); Hongfei Chen, Beijing (CN)

( * ) Notice: Subject to any disclaimer, the term of this patent is extended or adjusted under 35 U.S.C. 154(b) by 196 days.

(21) Appl. No.: 14/811,611

(22) Filed: Jul. 28, 2015

(65) Prior Publication Data

US 2015/0334055 A1 Nov. 19, 2015

Related U.S. Application Data

(63) Continuation of application No. PCT/CN2013/071088, filed on Jan. 29, 2013.

(51) Int. Cl.
*H04L 12/935* (2013.01)
*H04L 12/741* (2013.01)

(52) U.S. Cl.
CPC .......... *H04L 49/3009* (2013.01); *H04L 45/54* (2013.01); *H04L 45/745* (2013.01)

(58) Field of Classification Search
CPC . H04L 67/1002; H04L 67/1023; H04L 69/12; H04L 63/145; H04L 63/0245; H04L 45/00
See application file for complete search history.

(56) References Cited

U.S. PATENT DOCUMENTS

| 2003/0223364 A1* | 12/2003 | Yu ........................ H04L 45/7453 370/230.1 |
| 2006/0212426 A1* | 9/2006 | Shakara ................... H04L 45/00 |
| 2006/0262583 A1* | 11/2006 | Venkatachary ......... H03M 7/30 365/49.17 |
| 2010/0268952 A1* | 10/2010 | Chung .................. H04L 9/3236 713/170 |

(Continued)

FOREIGN PATENT DOCUMENTS

| CN | 101047649 A | 10/2007 |
| CN | 101267331 A | 9/2008 |
| CN | 101471923 A | 7/2009 |

(Continued)

OTHER PUBLICATIONS

"OpenFlow Switch Specification, Version1.3.0 (Wire Protocol 0x04)", Apr. 16, 2012, 105 pages.

*Primary Examiner* — Jung-Jen Liu (57) ABSTRACT

Embodiments provide a method, including: receiving, by a forwarding element, a packet through an inbound port; searching for, by the forwarding element, a port table according to the inbound port and determining a first offset, a first length, and an identifier of a first table; determining, by the forwarding element, a first key according to the first offset and the first length, searching for the first table according to the first key, and determining a first instruction; and processing, by the forwarding element, the packet according to the first instruction. In addition, a forwarding element is provided. In the foregoing technical solutions, before processing a packet, the forwarding element does not need to interpret a data format of the packet, so that the forwarding element can flexibly support packets in different data formats.

12 Claims, 4 Drawing Sheets

(56) References Cited

U.S. PATENT DOCUMENTS

2012/0131046 A1    5/2012   Leshchiner

FOREIGN PATENT DOCUMENTS

| CN | 101989954 A | 3/2011 |
|----|-------------|--------|
| CN | 102143074 A | 8/2011 |
| CN | 102333039 A | 1/2012 |
| CN | 102780619 A | 11/2012 |
| EP | 0 993 162 A2 | 4/2000 |
| EP | 1 168 710 A2 | 1/2002 |
| EP | 1 533 956 A2 | 5/2005 |
| JP | 2000-156713 A | 6/2000 |
| JP | 2001-517024 A | 10/2001 |
| WO | WO 99/14906 A1 | 3/1999 |

* cited by examiner

| Inbound port 701 | First offset 702 | First length 703 | Identifier of a first table 704 |

FIG. 7

| Second key 801 | Second instruction 802 |

FIG. 8

PACKET PROCESSING METHOD AND FORWARDING ELEMENT

CROSS-REFERENCE TO RELATED APPLICATIONS

This application is a continuation of International Application No. PCT/CN2013/071088, filed on Jan. 29, 2013, which is hereby incorporated by reference in its entirety.

TECHNICAL FIELD

Embodiments of the present invention relate to communications technologies, and in particular, to a packet processing method and a forwarding element.

BACKGROUND

In the prior art, after receiving a packet, a forwarding element needs to determine a data format of the packet, for example, the forwarding element determines whether the packet is an Internet Protocol (IP) packet or a Multiprotocol Label Switching (MPLS) packet, to process the packet. For example, after receiving an Ethernet packet, a switch needs to determine, according to a port table, that a protocol with which the Ethernet packet complies is the Media Access Control (MAC) Protocol. Then, the switch parses a MAC Protocol header of the Ethernet packet according to the MAC Protocol, to acquire a destination MAC Protocol address of the Ethernet packet.

SUMMARY

Embodiments of the present invention provide a packet processing method and a forwarding element. Before processing a packet, the forwarding element does not need to interpret a data format of the packet, so that the forwarding element can flexibly support packets in different data formats. When needing to support a new data format, the forwarding element can process a packet in the data format without the need of updating hardware or software.

According to a first aspect, a packet processing method is provided, including:

receiving, by a forwarding element, a packet through an inbound port;

searching for, by the forwarding element, a port table according to the inbound port, and determining a first offset, a first length, and an identifier of a first table, where the first offset, the first length, and the identifier of the first table correspond to the inbound port;

determining, by the forwarding element, a first key according to the first offset and the first length, searching for the first table according to the first key, and determining a first instruction; and processing, by the forwarding element, the packet according to the first instruction.

In the foregoing technical solution, the forwarding element determines the first offset and the first length according to the inbound port. The forwarding element determines the first key according to the first offset and the first length. The forwarding element determines the first instruction according to the first key, to process the packet. Therefore, before processing the packet, the forwarding element does not need to interpret a data format of the packet, so that the forwarding element can flexibly support packets in different data formats. When needing to support a new data format, the forwarding element can process a packet in the data format without the need of updating hardware or software.

In a first possible implementation manner of the first aspect, the determining, by the forwarding element, the first key according to the first offset and the first length includes:

acquiring, by the forwarding element, a first data segment in the packet, where a start position of the first data segment is determined according to the first offset, and a length of the first data segment is the first length; and determining, by the forwarding element, the first data segment as the first key.

In a second possible implementation manner of the first aspect, the determining, by the forwarding element, the first key according to the first offset and the first length includes:

acquiring, by the forwarding element, a second data segment in metadata, where a start position of the second data segment is determined according to the first offset, and a length of the second data segment is the first length; and determining, by the forwarding element, the second data segment as the first key.

According to the second possible implementation manner of the first aspect, in a third possible implementation manner of the first aspect, the metadata is stored in registers of the forwarding element; or the metadata is stored in a memory of the forwarding element.

According to the first aspect, the first possible implementation manner of the first aspect, the second possible implementation manner of the first aspect, or the third possible implementation manner of the first aspect, in a fourth possible implementation manner of the first aspect, the first instruction is used to instruct the forwarding element to perform an operation, where the operation includes at least one of the following operations: modifying the packet, calculating a checksum of the packet, writing the metadata, reading the metadata, updating a counter, performing committed access rate (CAR) processing on the packet, discarding the packet, sending the packet, and modifying a base offset of the packet.

According to the first aspect, the first possible implementation manner of the first aspect, the second possible implementation manner of the first aspect, or the third possible implementation manner of the first aspect, in a fifth possible implementation manner of the first aspect, the processing, by the forwarding element, the packet according to the first instruction includes:

determining, by the forwarding element, a base offset of the packet, a second offset, a second length, an identifier of a second table according to the first table, where the base offset of the packet, the second offset, the second length, and the identifier of the second table correspond to the first key;

determining, by the forwarding element, a second key according to the base offset of the packet, the second offset, and the second length, searching for the second table according to the second key, and determining a second instruction; and processing, by the forwarding element, the packet according to the second instruction.

According to a second aspect, a forwarding element is provided, including:

a receiving circuit, configured to receive a packet through an inbound port;

a searching unit, configured to search for a port table according to the inbound port, and determine a first offset, a first length, and an identifier of a first table, where the first offset, the first length, and the identifier of the first table correspond to the inbound port;

a determining unit, configured to determine a first key according to the first offset and the first length, search for the first table according to the first key, and determine a first instruction; and a processing unit, configured to process the packet according to the first instruction.

In the foregoing technical solution, the forwarding element determines the first offset and the first length according to the inbound port. The forwarding element determines the first key according to the first offset and the first length. The forwarding element determines the first instruction according to the first key, to process the packet. Therefore, before processing the packet, the forwarding element does not need to interpret a data format of the packet, so that the forwarding element can flexibly support packets in different data formats. When needing to support a new data format, the forwarding element can process a packet in the data format without the need of updating hardware or software.

In a first possible implementation manner of the second aspect, the searching unit is configured to:

acquire a first data segment in the packet, where a start position of the first data segment is determined according to the first offset, and a length of the first data segment is the first length; and determine the first data segment as the first key.

In a second possible implementation manner of the second aspect, the searching unit is configured to:

acquire a second data segment in metadata, where a start position of the second data segment is determined according to the first offset, and a length of the second data segment is the first length; and determine the second data segment as the first key.

According to the second possible implementation manner of the second aspect, in a third possible implementation manner of the second aspect, the forwarding element further includes registers or a memory, where the metadata is stored in the registers or the memory.

According to the second aspect, the first possible implementation manner of the second aspect, the second possible implementation manner of the second aspect, or the third possible implementation manner of the second aspect, in a fourth possible implementation manner of the second aspect, the first instruction is used to instruct the forwarding element to perform an operation, where the operation includes at least one of the following operations: modifying the packet, calculating a checksum of the packet, writing the metadata, reading the metadata, updating a counter, performing CAR processing on the packet, discarding the packet, sending the packet, and modifying a base offset of the packet.

According to the second aspect, the first possible implementation manner of the second aspect, the second possible implementation manner of the second aspect, or the third possible implementation manner of the second aspect, in a fifth possible implementation manner of the second aspect, the processing unit is configured to:

determine a base offset of the packet, a second offset, a second length, an identifier of a second table according to the first table, where the base offset of the packet, the second offset, the second length, and the identifier of the second table correspond to the first key;

determine a second key according to the base offset of the packet, the second offset, and the second length, search for the second table according to the second key, and determine a second instruction; and process the packet according to the second instruction.

According to a third aspect, a forwarding element is provided, including: a receiving circuit, a processor, a search engine, and a memory, where the receiving circuit is configured to receive a packet through an inbound port; and the processor is coupled with the receiving circuit, the processor is coupled with the memory, and the processor includes an instruction execution circuit and an instruction memory, where the instruction execution circuit is coupled with the instruction memory, the instruction memory is configured to store a computer instruction, and the instruction execution circuit performs the following actions by reading the computer instruction:

triggering the search engine, so that the search engine searches for a port table according to the inbound port, and determines a first offset, a first length, and an identifier of a first table, where the first offset, the first length, and the identifier of the first table correspond to the inbound port, and the port table is stored in the memory;

determining a first key according to the first offset and the first length;

triggering the search engine, so that the search engine searches for the first table according to the first key, and determines a first instruction; and processing the packet according to the first instruction.

In a first possible implementation manner of the third aspect, the search engine is further configured to acquire a first data segment in the packet, where a start position of the first data segment is determined according to the first offset, and a length of the first data segment is the first length;

the instruction execution circuit is further configured to determine the first data segment as the first key; and the processor further includes a data memory, where the data memory is coupled with the instruction execution circuit, and the packet is stored in the data memory.

In a second possible implementation manner of the third aspect, the search engine is further configured to acquire a second data segment in metadata, where a start position of the second data segment is determined according to the first offset, and a length of the second data segment is the first length; and the instruction execution circuit is further configured to determine the second data segment as the first key.

According to the second possible implementation manner of the third aspect, in a third possible implementation manner of the third aspect, the processor further includes registers, where the registers are coupled with the instruction execution circuit, and the metadata is stored in the registers.

According to the second possible implementation manner of the third aspect, in a fourth possible implementation manner of the third aspect, the metadata is stored in the memory.

According to the third aspect, the first possible implementation manner of the third aspect, the second possible implementation manner of the third aspect, the third possible implementation manner of the third aspect, or the fourth possible implementation manner of the third aspect, in a fifth possible implementation manner of the third aspect, the first instruction is used to instruct the instruction execution circuit to perform an operation, where the operation includes at least one of the following operations: modifying the packet, calculating a checksum of the packet, writing the metadata, reading the metadata, updating a counter, performing CAR processing on the packet, discarding the packet, sending the packet, and modifying a base offset of the packet.

According to the third aspect, the first possible implementation manner of the third aspect, the second possible implementation manner of the third aspect, the third possible implementation manner of the third aspect, or the fourth possible implementation manner of the third aspect, in a sixth possible implementation manner of the third aspect, the instruction execution circuit is further configured to:

determine a base offset of the packet, a second offset, a second length, an identifier of a second table according to the first table, where the base offset of the packet, the second offset, the second length, and the identifier of the second table correspond to the first key;

the instruction execution circuit is further configured to: determine a second key according to the base offset of the packet, the second offset, and the second length;

the instruction execution circuit is further configured to trigger the search engine, so that the search engine searches for the second table according to the second key, and determines a second instruction; and the instruction execution circuit is further configured to process the packet according to the second instruction.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
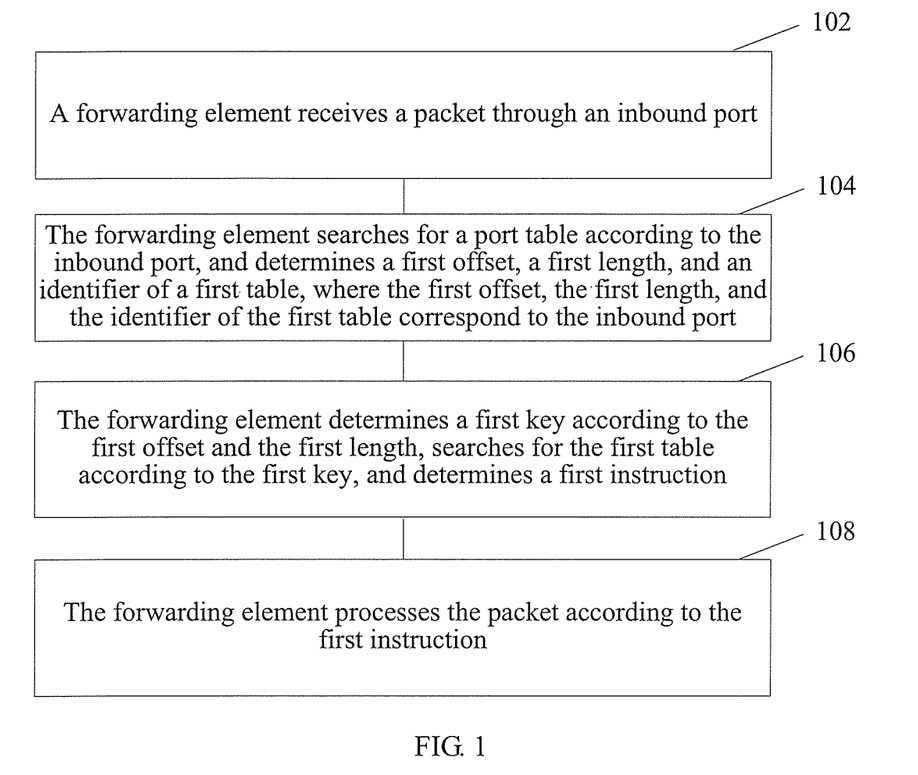
FIG. 1 is a schematic flowchart of a packet processing method according to an embodiment of the present invention.

FIG. 1 is a schematic flowchart of a packet processing method according to an embodiment of the present invention. Referring to FIG. 1, the method includes:

102: A forwarding element receives a packet through an inbound port.

For example, the forwarding element may be a router, a switch, a firewall, or a load balancer.

For example, the packet may be an IP packet, an Ethernet packet, or an MPLS packet.

For example, 102 may be performed by a receiving circuit.

104: The forwarding element searches for a port table according to the inbound port, and determines a first offset, a first length, and an identifier of a first table, where the first offset, the first length, and the identifier of the first table correspond to the inbound port.

For example, the first offset, the first length, and the identifier of the first table are stored in an entry of the port table matching the inbound port. There may be one or more first offsets. There may be one or more first lengths. The multiple offsets are in a one-to-one correspondence to the multiple lengths.

For example, the first table may be a MAC Protocol table, an Address Resolution Protocol (ARP) table, a forwarding information base (FIB), or an MPLS label table.

For example, 104 may be performed by a search engine.

106: The forwarding element determines a first key according to the first offset and the first length, searches for the first table according to the first key, and determines a first instruction.

For example, the first key may be a data segment in the packet. The first key may also be a data segment in metadata. The metadata is stored in registers.

For example, there may be one or more first keys. The multiple keys are in a one-to-one correspondence to the multiple offsets. The multiple keys are in a one-to-one correspondence to the multiple lengths.

For example, the first key may come only from the packet, or may come only from the metadata. The first key may also come from the packet and the metadata.

For example, 106 may be performed by the search engine and an instruction execution circuit.

108: The forwarding element processes the packet according to the first instruction.

For example, the first instruction may be an instruction defined in the *OpenFlow Switch Specification* 1.3.0 released by a standard setting organization (SSO), the Open Networking Foundation (ONF).

For example, 108 may be performed by a network processor (NP). Specifically, 108 may be performed by an instruction execution circuit in the NP.

In the foregoing technical solution, the forwarding element determines the first offset and the first length according to the inbound port. The forwarding element determines the first key according to the first offset and the first length. The forwarding element determines the first instruction according to the first key, to process the packet. Therefore, before processing the packet, the forwarding element does not need to interpret a data format of the packet, so that the forwarding element can flexibly support packets in different data formats. When needing to support a new data format, the forwarding element can process a packet in the data format without the need of updating hardware or software.

Figure 2:
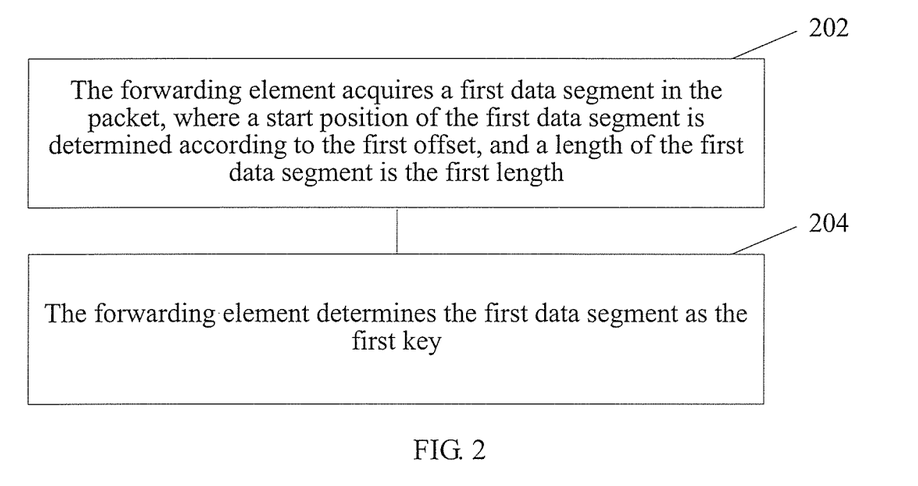
FIG. 2 is a schematic flowchart of a packet processing method according to an embodiment of the present invention.

Optionally, in the method shown in FIG. 1, the determining, by the forwarding element, the first key according to the first offset and the first length includes:

202: The forwarding element acquires a first data segment in the packet, where a start position of the first data segment is determined according to the first offset, and a length of the first data segment is the first length.

204: The forwarding element determines the first data segment as the first key.

For details about 202 and 204, refer to FIG. 2.

For example, that the start position of the first data segment is determined according to the first offset may specifically be that the start position of the first data segment may be identified by using a sum of a first base offset and the first offset, where the first base offset is 0.

In the foregoing technical solution, the first key comes from the packet.

Figure 3:
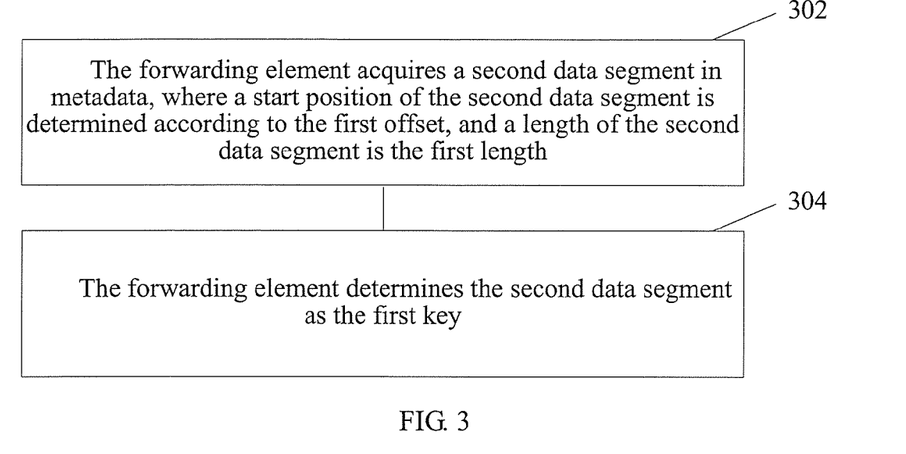
FIG. 3 is a schematic flowchart of a packet processing method according to an embodiment of the present invention.

Optionally, in the method shown in FIG. 1, the determining, by the forwarding element, the first key according to the first offset and the first length includes:

302: The forwarding element acquires a second data segment in metadata, where a start position of the second data segment is determined according to the first offset, and a length of the second data segment is the first length.

304: The forwarding element determines the second data segment as the first key.

For details about 302 and 304, refer to FIG. 3.

For example, that the start position of the second data segment is determined according to the first offset may specifically be that the start position of the second data segment may be identified by using a sum of a second base offset and the first offset, where the second base offset is 0.

In the foregoing technical solution, the first key comes from the metadata.

Optionally, in the method shown in FIG. 1, the metadata is stored in registers of the forwarding element.

For example, the registers may be located in an NP.

Optionally, in the method shown in FIG. 1, the metadata is stored in a memory of the forwarding element.

For example, the memory may be coupled with the NP.

Optionally, in the method shown in FIG. 1, the first instruction is used to instruct the forwarding element to perform an operation, where the operation includes at least one of the following operations: modifying the packet, calculating a checksum of the packet, writing the metadata, reading the metadata, updating a counter, performing CAR processing on the packet, discarding the packet, sending the packet, and modifying a base offset of the packet.

For example, modifying the packet may be deleting a data segment in the packet, replacing a data segment in the packet, or inserting a data segment into the packet.

For example, the checksum may be an IP checksum, a Transmission Control Protocol (TCP) checksum, or a User Datagram Protocol (UDP) checksum.

Figure 4:
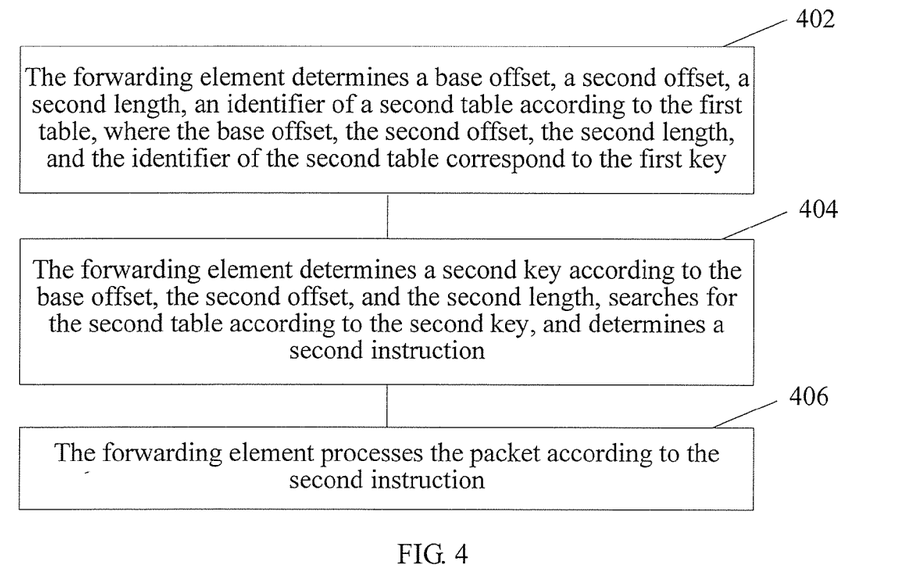
FIG. 4 is a schematic flowchart of a packet processing method according to an embodiment of the present invention.

Optionally, in the method shown in FIG. 1, the processing, by the forwarding element, the packet according to the first instruction includes:

402: The forwarding element determines a base offset, a second offset, a second length, an identifier of a second table according to the first table, where the base offset, the second offset, the second length, and the identifier of the second table correspond to the first key.

For example, the base offset is equal to the sum of the first base offset and the first offset.

404: The forwarding element determines a second key according to the base offset, the second offset, and the second length, searches for the second table according to the second key, and determines a second instruction.

For example, there may be one or more second keys. If there are multiple second keys, there are multiple base offsets, there are multiple second offsets, and there are multiple second lengths. The multiple base offsets are in a one-to-one correspondence to the multiple keys. The multiple second offsets are in a one-to-one correspondence to the multiple keys. The multiple second lengths are in a one-to-one correspondence to the multiple keys.

For example, the second key may come only from the packet, or may come only from the metadata. The second key may also come from the packet and the metadata.

406: The forwarding element processes the packet according to the second instruction.

For example, the second instruction may be an instruction defined in the *OpenFlow Switch Specification* 1.3.0 released by the ONF.

For details about 402, 404, and 406, refer to FIG. 4.

Figure 5:
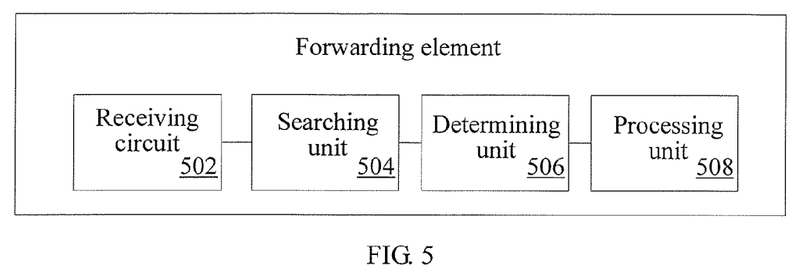
FIG. 5 is a schematic structural diagram of a forwarding element according to an embodiment of the present invention.

FIG. 5 is a schematic structural diagram of a forwarding element according to an embodiment of the present invention. The forwarding element may be configured to perform the method shown in FIG. 1. For example, the forwarding element may be a router, a switch, a firewall, or a load balancer. Referring to FIG. 5, the forwarding element includes a receiving circuit 502, a searching unit 504, a determining unit 506, and a processing unit 508.

The receiving circuit 502 is configured to receive a packet through an inbound port.

For example, the packet may be an IP packet, an Ethernet packet, or an MPLS packet.

The searching unit 504 is configured to search for a port table according to the inbound port, and determine a first offset, a first length, and an identifier of a first table, where the first offset, the first length, and the identifier of the first table correspond to the inbound port.

For example, the first offset, the first length, and the identifier of the first table are stored in an entry of the port table matching the inbound port. There may be one or more first offsets. There may be one or more first lengths. The multiple offsets are in a one-to-one correspondence to the multiple lengths.

For example, the first table may be a MAC Protocol table, an ARP table, a FIB, or an MPLS label table.

For example, the searching unit 504 may be a search engine.

The determining unit 506 is configured to determine a first key according to the first offset and the first length, search for the first table according to the first key, and determine a first instruction.

For example, the first key may be a data segment in the packet. The first key may also be a data segment in metadata. The metadata is stored in registers.

For example, there may be one or more first keys. The multiple keys are in a one-to-one correspondence to the multiple offsets. The multiple keys are in a one-to-one correspondence to the multiple lengths.

For example, the first key may come only from the packet, or may come only from the metadata. The first key may also come from the packet and the metadata.

For example, the determining unit 506 may be a search engine and an instruction execution circuit.

The processing unit 508 is configured to process the packet according to the first instruction.

For example, the first instruction may be an instruction defined in the *OpenFlow Switch Specification* 1.3.0 released by the ONF.

For example, the processing unit 508 may be an NP, and specifically, the processing unit 508 may be an instruction execution circuit in the NP.

In the foregoing technical solution, the forwarding element determines the first offset and the first length according to the inbound port. The forwarding element determines the first key according to the first offset and the first length. The forwarding element determines the first instruction according to the first key, to process the packet. Therefore, before processing the packet, the forwarding element does not need to interpret a data format of the packet, so that the forwarding element can flexibly support packets in different data formats. When needing to support a new data format, the forwarding element can process a packet in the data format without the need of updating hardware or software.

Optionally, in the forwarding element described in FIG. 5, the searching unit 504 is configured to:

acquire a first data seyinent in the packet, where a start position of the first data segment is determined according to the first offset, and a length of the first data segment is the first length; and determine the first data segment as the first key.

For example, that the start position of the first data segment is determined according to the first offset may specifically be that the start position of the first data segment may be identified by using a sum of a first base offset and the first offset, where the first base offset is 0.

In the foregoing technical solution, the first key comes from the packet.

Optionally, in the forwarding element described in FIG. 5, the searching unit 504 is configured to:

acquire a second data segment in metadata, where a start position of the second data segment is determined according to the first offset, and a length of the second data segment is the first length; and determine the second data segment as the first key.

For example, that the start position of the second data segment is determined according to the first offset may specifically be that the start position of the second data segment may be identified by using a sum of a second base offset and the first offset, where the second base offset is 0.

In the foregoing technical solution, the first key comes from the metadata.

Optionally, the forwarding element described in FIG. 5 further includes registers or a memory.

The metadata is stored in the registers or the memory.

Optionally, in the forwarding element described in FIG. 5, the first instruction is used to instruct the forwarding element to perform an operation, where the operation includes at least one of the following operations: modifying the packet, calculating a checksum of the packet, writing the metadata, reading the metadata, updating a counter, performing CAR processing on the packet, discarding the packet, sending the packet, and modifying a base offset of the packet.

For example, modifying the packet may be deleting a data segment in the packet, replacing a data segment in the packet, or inserting a data segment into the packet.

For example, the checksum may be an IP checksum, a Transmission Control Protocol TCP checksum, or a UDP checksum.

Optionally, in the forwarding element described in FIG. 5, the processing unit 508 is configured to:

determine a base offset of the packet, a second offset, a second length, an identifier of a second table according to the first table, where the base offset of the packet, the second offset, the second length, and the identifier of the second table correspond to the first key;

determine a second key according to the base offset of the packet, the second offset, and the second length, search for the second table according to the second key, and determine a second instruction; and process the packet according to the second instruction.

For example, the base offset is equal to the sum of the first base offset and the first offset.

For example, there may be one or more second keys. If there are multiple second keys, there are multiple base offsets, there are multiple second offsets, and there are multiple second lengths. The multiple base offsets are in a one-to-one correspondence to the multiple keys. The multiple second offsets are in a one-to-one correspondence to the multiple keys. The multiple second lengths are in a one-to-one correspondence to the multiple keys.

For example, the second key may come only from the packet, or may come only from the metadata. The second key may also come from the packet and the metadata.

For example, the second instruction may be an instruction defined in the *OpenFlow Switch Specification* 1.3.0 released by the ONF.

Figure 6:
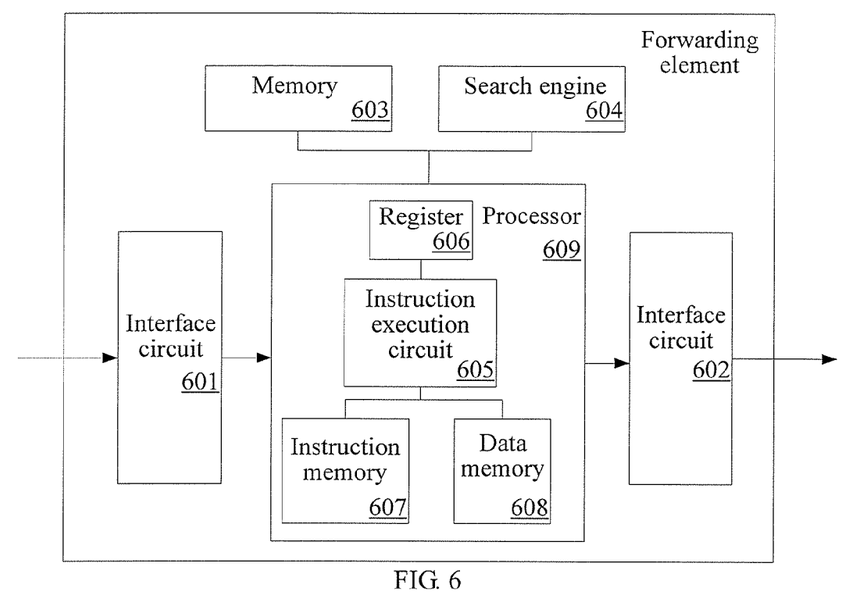
FIG. 6 is a schematic structural diagram of a forwarding element according to an embodiment of the present invention.

FIG. 6 is a schematic structural diagram of a forwarding element according to an embodiment of the present invention. The forwarding element may be configured to perform the method shown in FIG. 1. For example, the forwarding element may be a router, a switch, a firewall, or a load balancer. Referring to FIG. 6, the forwarding element includes: an interface circuit 601, an interface circuit 602, a memory 603, a search engine 604, and a processor 609. The processor 609 includes an instruction execution circuit 605 and an instruction memory 607. Optionally, the processor 609 may include registers 606 and a data memory 608.

The receiving circuit 601 is configured to receive a packet through an inbound port.

The processor 609 is coupled with the receiving circuit 601, the processor 609 is coupled with the memory 603, and the processor 609 includes the instruction execution circuit 605 and the instruction memory 607, where the instruction execution circuit 605 is coupled with the instruction memory 607, the instruction memory 607 is configured to store a computer instruction, and the instruction execution circuit 605 performs the following actions by reading the computer instruction:

triggering the search engine 604, so that the search engine 604 searches for a port table according to the inbound port, and determines a first offset, a first length, and an identifier of a first table, where the first offset, the first length, and the identifier of the first table correspond to the inbound port, and the port table is stored in the memory 603;

determining a first key according to the first offset and the first length;

triggering the search engine 604, so that the search engine 604 searches for the first table according to the first key, and determines a first instruction; and processing the packet according to the first instruction.

For example, the processor 609 may be coupled with the memory 603 by using a crossbar. The processor 609 may be coupled with the search engine 604 by using the crossbar.

For example, the packet may be an IP packet, an Ethernet packet, or an MPLS packet.

For example, the first offset, the first length, and the identifier of the first table are stored in an entry of the port table matching the inbound port. There may be one or more first offsets. There may be one or more first lengths. The multiple offsets are in a one-to-one correspondence to the multiple lengths.

Figure 7:
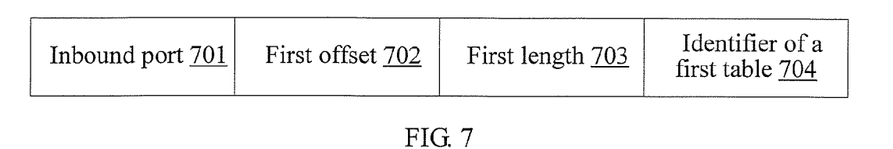
FIG. 7 is a schematic diagram of a format of an entry according to an embodiment of the present invention.

FIG. 7 is a schematic diagram of a format of an entry of the port table. An inbound port 701, a first offset 702, a first length 703, and an identifier 704 of a first table in FIG. 7 respectively correspond to the inbound port, the first offset, the first length, and the identifier of the first table.

For example, the first table may be a MAC Protocol table, an ARP table, a FIB, or an MPLS label table.

For example, the first key may be a data segment in the packet. The first key may also be a data segment in metadata. The metadata is stored in the registers.

For example, there may be one or more first keys. The multiple keys are in a one-to-one correspondence to the multiple offsets. The multiple keys are in a one-to-one correspondence to the multiple lengths.

For example, the first key may come only from the packet, or may come only from the metadata. The first key may also come from the packet and the metadata.

For example, the first instruction may be an instruction defined in the *OpenFlow Switch Specification* 1.3.0 released by the ONF.

In the foregoing technical solution, the forwarding element determines the first offset and the first length according to the inbound port. The forwarding element determines the first key according to the first offset and the first length. The forwarding element determines the first instruction according to the first key, to process the packet. Therefore, before processing the packet, the forwarding element does not need to interpret a data format of the packet, so that the forwarding element can flexibly support packets in different data formats. When needing to support a new data format, the forwarding element can process a packet in the data format without the need of updating hardware or software.

Optionally, in the forwarding element shown in FIG. 6, the search engine 604 is further configured to acquire a first data segment in the packet, where a start position of the first data segment is determined according to the first offset, and a length of the first data segment is the first length.

The instruction execution circuit 605 is further configured to determine the first data segment as the first key.

The processor further includes the data memory 608, where the data memory 608 is coupled with the instruction execution circuit 605, and the packet is stored in the data memory 608.

For example, that the start position of the first data segment is determined according to the first offset may specifically be that the start position of the first data segment may be identified by using a sum of a first base offset and the first offset, where the first base offset is 0.

In the foregoing technical solution, the first key comes from the packet.

Optionally, in the forwarding element shown in FIG. 6, the search engine 604 is further configured to acquire a second data segment in metadata, where a start position of the second data segment is determined according to the first offset, and a length of the second data segment is the first length.

The instruction execution circuit 605 is further configured to determine the second data segment as the first key.

For example, that the start position of the second data segment is determined according to the first offset may specifically be that the start position of the second data segment may be identified by using a sum of a second base offset and the first offset, where the second base offset is 0.

In the foregoing technical solution, the first key comes from the metadata.

Optionally, in the forwarding element shown in FIG. 6, the processor 609 further includes the registers 606, where the registers 606 are coupled with the instruction execution circuit 605, and the metadata is stored in the registers 606.

Optionally, in the forwarding element shown in FIG. 6, the metadata is stored in the memory 603.

Optionally, in the forwarding element shown in FIG. 6, the first instruction is used to instruct the instruction execution circuit to perform an operation, where the operation includes at least one of the following operations: modifying the packet, calculating a checksum of the packet, writing the metadata, reading the metadata, updating a counter, performing CAR processing on the packet, discarding the packet, sending the packet, and modifying a base offset of the packet.

For example, modifying the packet may be deleting a data segment in the packet, replacing a data segment in the packet, or inserting a data segment into the packet.

For example, the checksum may be an IP checksum, a TCP checksum, or a UDP checksum.

For example, the packet may be sent by the interface circuit 602.

Optionally, in the forwarding element shown in FIG. 6, the instruction execution circuit 605 is further configured to:

determine a base offset of the packet, a second offset, a second length, an identifier of a second table according to the first table, where the base offset of the packet, the second offset, the second length, and the identifier of the second table correspond to the first key;

the instruction execution circuit 605 is further configured to:

determine a second key according to the base offset of the packet, the second offset, and the second length.

The instruction execution circuit 605 is further configured to trigger the search engine 604, so that the search engine 604 searches for the second table according to the second key, and determines a second instruction.

The instruction execution circuit 605 is further configured to process the packet according to the second instruction.

For example, the base offset is equal to the sum of the first base offset and the first offset.

For example, there may be one or more second keys. If there are multiple second keys, there are multiple base offsets, there are multiple second offsets, and there are multiple second lengths. The multiple base offsets are in a one-to-one correspondence to the multiple keys. The multiple second offsets are in a one-to-one correspondence to the multiple keys. The multiple second lengths are in a one-to-one correspondence to the multiple keys.

For example, the second key may come only from the packet, or may come only from the metadata. The second key may also come from the packet and the metadata.

For example, the second instruction may be an instruction defined in the *OpenFlow Switch Specification* 1.3.0 released by the ONF.

Figure 8:
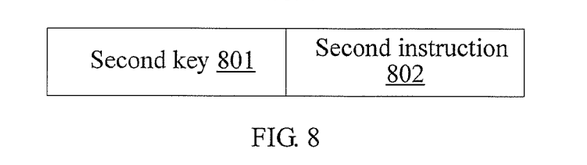
FIG. 8 is a schematic diagram of a format of an entry according to an embodiment of the present invention.

For example, an entry of the second table includes the second key and the second instruction. FIG. 8 is a schematic diagram of a format of the entry of the second table. A second key 801 and a second instruction 802 in FIG. 8 respectively correspond to the second key and the second instruction.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A packet processing method, comprising:
   receiving, by a forwarding element, a packet through an inbound port;
   searching, by the forwarding element, for a first offset, a first length, and an identifier of a first table according to a port table and the inbound port, wherein the first offset, the first length, and the identifier of the first table are stored in an entry of the port table and the first offset, the first length, and the identifier of the first table correspond to the inbound port;
   determining, by the forwarding element, a first key and a first instruction, wherein the first key is determined according to the first offset and the first length, and wherein the first instruction is determined via a search of the first table according to the first key; and
   processing, by the forwarding element, the packet according to the first instruction.

2. The method according to claim 1, wherein determining, by the forwarding element, the first key according to the first offset and the first length comprises:
   acquiring, by the forwarding element, a first data segment in the packet, wherein a start position of the first data segment is determined according to the first offset, and a length of the first data segment is the first length; and
   determining, by the forwarding element, the first data segment as the first key.

3. The method according to claim 1, wherein determining, by the forwarding element, the first key according to the first offset and the first length comprises:
   acquiring, by the forwarding element, a second data segment in metadata, wherein a start position of the second data segment is determined according to the first offset, and a length of the second data segment is the first length; and
   determining, by the forwarding element, the second data segment as the first key.

4. The method according to claim 3, wherein:
   the metadata is stored in registers of the forwarding element; or
   the metadata is stored in a memory of the forwarding element.

5. The method according to claim 1, wherein:
   the first instruction is used to instruct the forwarding element to perform an operation, wherein the operation comprises at least one of the following operations: modifying the packet, calculating a checksum of the packet, writing the metadata, reading the metadata, updating a counter, performing committed access rate (CAR) processing on the packet, discarding the packet, sending the packet, and modifying a base offset of the packet.

6. The method according to claim 1, wherein processing, by the forwarding element, the packet according to the first instruction comprises:
   determining a base offset of the packet, a second offset, a second length, an identifier of a second table according to the first table, wherein the base offset of the packet, the second offset, the second length, and the identifier of the second table correspond to the first key;
   determining a second key and a second instruction, wherein the second key is determined according to the base offset of the packet, the second offset, and the second length, and wherein the second instruction is determined via a search of the second table according to the second key; and
   processing the packet according to the second instruction.

7. A forwarding element, comprising:
   a receiving circuit, configured to receive a packet through an inbound port;
   a searching unit, configured to search for a first offset, a first length, and an identifier of a first table according to a port table and the inbound port, wherein the first offset, the first length, and the identifier of the first table are stored in an entry of the port table and the first offset, the first length, and the identifier of the first table correspond to the inbound port;

a determining unit, configured to determine a first key and a first instruction, wherein the first key is determined according to the first offset and the first length, and wherein the first instruction is determined via a search of the first table according to the first key; and a processing unit, configured to process the packet according to the first instruction.

8. The forwarding element according to claim 7, wherein the searching unit is configured to:

acquire a first data segment in the packet, wherein a start position of the first data segment is determined according to the first offset, and a length of the first data segment is the first length; and determine the first data segment as the first key.

9. The forwarding element according to claim 7, wherein the searching unit is configured to:

acquire a second data segment in metadata, wherein a start position of the second data segment is determined according to the first offset, and a length of the second data segment is the first length; and determine the second data segment as the first key.

10. The forwarding element according to claim 9, further comprising registers or a memory, wherein the metadata is stored in the registers or the memory.

11. The forwarding element according to claim 7, wherein the first instruction is used to instruct the forwarding element to perform an operation, wherein the operation comprises at least one of the following operations: modifying the packet, calculating a checksum of the packet, writing the metadata, reading the metadata, updating a counter, performing CAR processing on the packet, discarding the packet, sending the packet, and modifying a base offset of the packet.

12. The forwarding element according to claim 7, wherein the processing unit is configured to:

determine a base offset of the packet, a second offset, a second length, an identifier of a second table according to the first table, wherein the base offset of the packet, the second offset, the second length, and the identifier of the second table correspond to the first key;

determine a second key and a second instruction, wherein the second key is determined according to the base offset of the packet, the second offset, and the second length, and wherein the second instruction is determined via a search of the second table according to the second key; and process the packet according to the second instruction.

* * * * *

UNITED STATES PATENT AND TRADEMARK OFFICE
CERTIFICATE OF CORRECTION

PATENT NO. : 9,749,262 B2  
APPLICATION NO. : 14/811611  
DATED : August 29, 2017  
INVENTOR(S) : Jun Gong et al.

It is certified that error appears in the above-identified patent and that said Letters Patent is hereby corrected as shown below:

On the Title Page

After (72) before ( * ): insert --(73) Assignee: Huawei Technologies Co., Ltd., Shenzhen (CN)--

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*